No. 757,905. PATENTED APR. 19, 1904.
F. FREDEEN.
GRAIN SCREEN.
APPLICATION FILED NOV. 18, 1903.
NO MODEL. 3 SHEETS—SHEET 1.
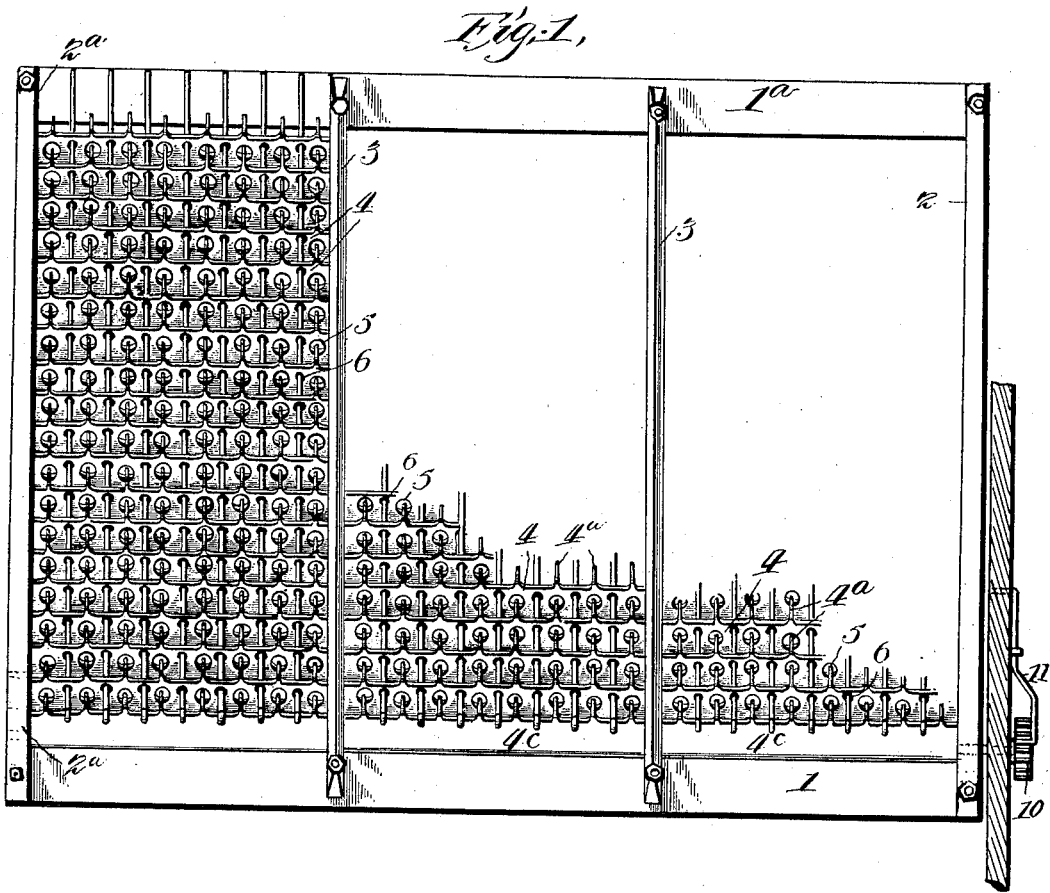
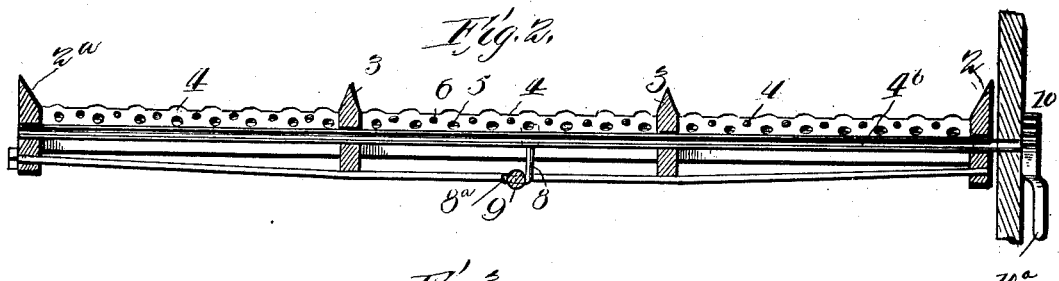
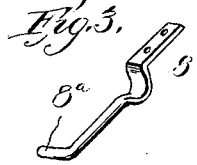
WITNESSES: INVENTOR
Frank Fredeen,
BY
ATTORNEYS.

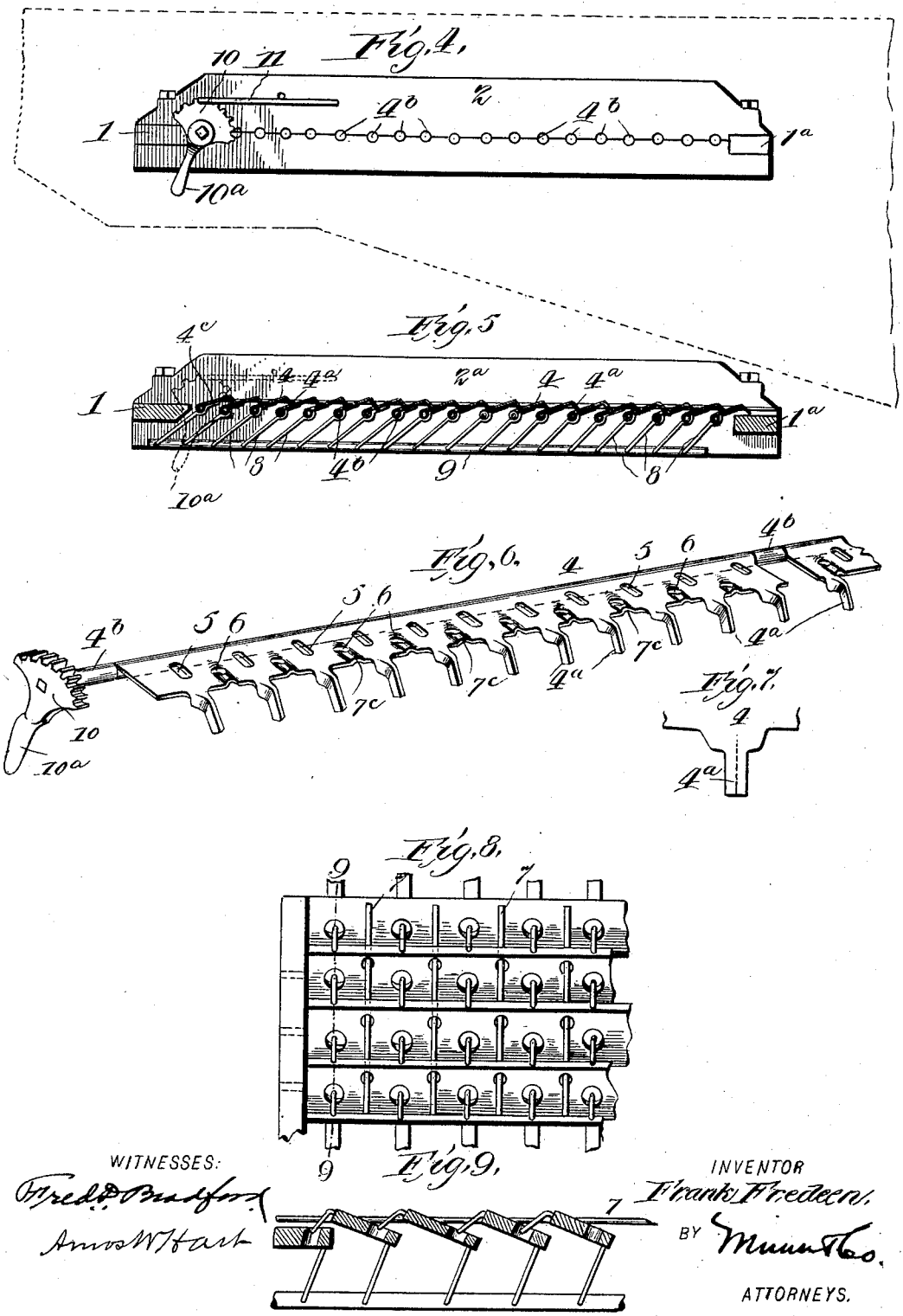

No. 757,905. PATENTED APR. 19, 1904.
F. FREDEEN.
GRAIN SCREEN.
APPLICATION FILED NOV. 18, 1903.
NO MODEL. 3 SHEETS—SHEET 3.
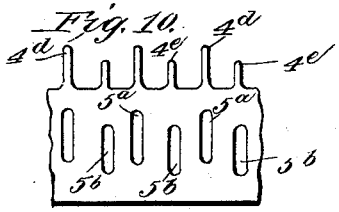
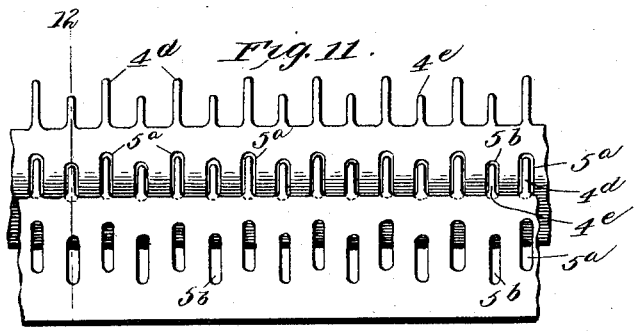
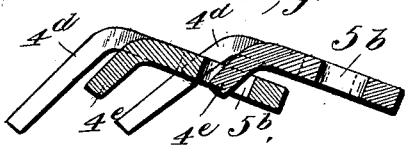
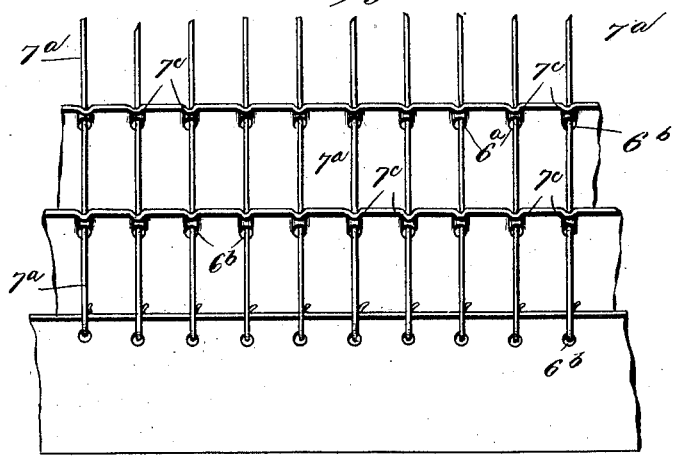
WITNESSES:
Fred D. Bradford
Amos W. Hart
INVENTOR
Frank Fredeen
BY Munn & Co.
ATTORNEYS No. 757,905. Patented April 19, 1904.

UNITED STATES PATENT OFFICE.

FRANK FREDEEN, OF TAYLORS FALLS, MINNESOTA.

GRAIN-SCREEN.

SPECIFICATION forming part of Letters Patent No. 757,905, dated April 19, 1904.

Application filed November 18, 1903. Serial No. 181,696. (No model.)

*To all whom it may concern:*

Be it known that I, FRANK FREDEEN, a citizen of the United States, and a resident of Taylors Falls, in the county of Chisago and State of Minnesota, have made certain new and useful Improvements in Grain-Screens, of which the following is a specification.

My invention is an improvement in that class of grain screens or sieves which are provided with transverse slats pivoted in such manner as to adapt them to be adjusted at different angles. I have devised certain novel features whereby the screen or sieve is free from some objections to others of its class and is superior in other points, as hereinafter set forth.

The details of construction, arrangement, and operation of parts are as hereinafter described, reference being had to the accompanying drawings, in which—

Figure 1 is a plan view of my improved screen or sieve. Fig. 2 is a transverse vertical section of the same. Fig. 3 is a perspective view of one of the attachments of the sieve. Fig. 4 is a side view of the sieve. Fig. 5 is a vertical longitudinal section. Fig. 6 is a perspective view of part of one of the transverse metal slats. Fig. 7 is a detail view illustrating manner of constructing the fingers of the slats. Fig. 8 is a plan view of a portion of the sieve, illustrating wooden slats and the arrangement and coaction of the slat-fingers and spacing-wires with the slat-openings. Fig. 9 is a cross-section on the line 9 9 of Fig. 8. Fig. 10 is a plan view of a portion of a slat of modified form. Fig. 11 is a plan view illustrating the relative arrangement of slats such as is shown in Fig. 10. Fig. 12 is a cross-section on line 12 12 of Fig. 11. Fig. 13 is a plan view of a series of fingerless slats having spring-wires attached to the shifting slat and passing through the upper edges of the companion slats.

As shown in Fig. 1, the frame of my improved screen or sieve is rectangular and composed of end bars 1 1$^a$, side bars 2 2$^a$, and ribs 3, which are arranged parallel with the said side bars and spaced equidistantly therefrom and from each other. The end bars 1 1$^a$, which are mortised into the said side bars 2, and the ribs 3 are secured by bolts and nuts, so that the sieve-frame may be quickly taken to pieces and slats removed or renewed if occasion requires. A detachable truss-rod connects the side bars 2 2$^a$ and passes under the ribs 3, as shown in Fig. 2. Between the ribs and between the ribs and side bars are arranged transverse slats 4, the same having journals at their ends whereby they are pivoted in the said ribs and side bars, as will be understood by reference to Figs. 4 and 5. As shown in Fig. 6, each of the slats is composed of a sheet-metal plate having a series of fingers 4$^a$ and rolled at the opposite edge to form a hollow shaft 4$^b$. This shaft is extended beyond the slat proper and rolled to form integral journals. In this manner a very light but strong journal is produced, it being in this respect much to be preferred to a solid-metal journal, which would require to be attached to the slat proper by rivets or equivalent means. By my improved construction no riveting or soldering is required and a weak joint is avoided. I preferably construct the slats of aluminium or zinc, but propose to employ any suitable material. As will be understood by reference to Fig. 7, the fingers 4$^a$, which are integral with the body of the slat, are formed by projecting flat portions, which are subsequently doubled and compressed laterally. As thus constructed the fingers have great strength and are also thin and narrow, so as to offer little obstruction to the blast. While I prefer to form the rear edge of each slat by rolling the sheet metal upon itself, I do not propose to restrict myself in all cases to this construction, since it is obvious that the slat might be attached to a transverse rotatable shaft. The ends of the lower portion of the slats may be extended, as shown in Fig. 6, to form the journals or bearings for the same. By this construction the slats are at once light, strong, durable, and smooth. It will be noted in Fig. 5 that the fingers 4$^a$ are formed at an obtuse angle, and thus project downward and forward from the edges of the slats. The fingers being formed integral with the body of the slat and compressed laterally embody maximum strength and lightness. The slats are provided with two series of holes 5 and 6.

The former, 5, are preferably oval; but they may be circular, and they are formed in the slat equidistant from its edges and from each other. These openings are provided for the passage of the subdividing finger of the rear adjoining companion slat, and the openings of course also allow the upward passage of air. The fingers of each slat register or coincide with the openings 5 of the adjacent slat on the right. (See Fig. 5.) As shown also in Figs. 6 and 13, the edges of the slats are bent upward at 7°—that is to say, at points directly opposite the openings 6. This construction provides space for the wires 7, so that the slats may be closed down and lie close one upon another in a manner which would not be otherwise practicable.

The smaller holes 6 serve for reception of spacing-wires 7, which are attached to the first slat $4^c$ of the series (see Fig. 1) and extend through the several openings in the several slats parallel to each other and the sides of the frame. These wires serve to divide the longitudinal slot or space formed between adjacent slats. In conjunction with the fingers $4^a$ and the angular free edges of the body of the slats they serve to support the mingled straw, stubble, grain, chaff, and other material while being acted upon by the blast of air from below. In some cases the sieve may be operated without the wires 7, and by attaching them in the manner described they may be detached and withdrawn with little difficulty. The blast is divided and deflected by contact with the under sides of the slats 4 and is further divided or broken by the openings in the slats and the spacing-wires 7. When the slats are adjusted at such an angle that the fingers $4^a$ do not enter the openings 6 in the adjoining slats, coarse grain, such as oats and barley, passes through the said openings and also between the slats; but when the slats are adjusted as shown in Fig. 5, with the fingers projecting into the openings 5, the latter are partly filled, and the sieve is in condition for separating smaller grains, such as wheat, rye, flax, and grass-seed. All the slats 4 are so connected and pivoted that they may be adjusted simultaneously at a greater or less angle. The means for this are illustrated in Figs. 3 and 5—that is to say, a lever-arm 8 is riveted to the under side of each slat and provided at its lower end with a lateral prong or finger $8^a$, which enters a hole in a coupling-rod 9. Upon the extended shaft of the first slat $4^c$ (see Figs. 1 and 2) is keyed a toothed segment 10, provided with a lever-arm $10^a$. (See Figs. 4 and 6.) A spring-detent 11 engages the segment and serves to lock it in any desired adjustment. It is apparent that by turning the segment by means of the handle $10^a$ all the slats 4 may be adjusted at any required inclination or angle and then locked by means of the detent 11. Such adjustment may be effected even when the sieve forms part of a winnower or grain-cleaner and the latter is in actual operation.

In practice the sieve-frame is placed in a shoe (see dotted lines, Fig. 4) and the segment and lever are applied to the extended and squared end of the first or shifting slat that projects through the side of the second shoe.

It will be seen that the blast is deflected by the slats and passes up between them, a small portion passing also through the holes in the slats; that the light material, such as straw and chaff, is lifted away from the grain, which falls downward between the slats and through the divided openings; that the slat-fingers and spacing-wires form a close-meshed sieve having thin or narrow parts on which the mingled straw, grain, chaff, &c., are supported and that heavy and large pieces of stubble are prevented from passing through; that the separation of the grain is effected rapidly; that there is no liability of gumming or clogging when the grain is wet and sticky or contains much dirt, since the material is supported mainly by the wire fingers and upper edges of the slats and comes but little in contact with the flat body of the slats.

Figs. 8 and 9 illustrate a modification, the slats being constructed of wood.

In the modified form of slat shown in Figs. 10, 11, 12 there are two sets of fingers or alternating long and short fingers $4^d$ and $4^e$ and slots $5^a$ and $5^b$, which are arranged correspondingly.

While I have illustrated and specifically described one example of an embodiment of my invention, I do not thereby intend to restrict the scope thereof to the exact details of construction illustrated, since changes and modifications, additions, or substitutions may be made or some parts omitted at the will of the manufacturer without constituting a substantial departure.

Having thus described my invention, what I claim as new, and desire to secure by Letters Patent, is—

1. The improved grain-sieve comprised of a suitable rectangular frame, and a series of pivoted slats arranged transversely and having openings, and fingers and spacing-wires adapted to enter the openings of adjoining slats, substantially as described.

2. In a grain-sieve, the transverse pivoted slats constructed of sheet metal and having on one edge a series of integral fingers which are formed of projections from the plate constituting the body of the slat, the same being compressed laterally, as shown and described.

3. A grain-sieve comprising a suitable frame, a series of transverse pivoted slats having subdividing spacing-fingers and openings near their top edge, and spacing-wires and fingers passing through the said openings, substantially as described.

4. The grain-sieve formed of a suitable frame, and transverse pivoted slats provided with openings and a series of wires passing through said openings, the edges of the slats being recessed on the under side to allow spaces for the wires when the slats are folded, as described.

5. The improved sieve comprising a suitable frame, a series of transverse slats, pivoted as described, and provided with two sets of openings, and with a series of fingers adapted to enter the larger openings of adjoining slats, and a series of spacing-wires passing through the smaller openings and arranged intermediately of the fingers, substantially as shown and described.

6. The combination, with a suitable frame, and a series of pivoted slats arranged transversely and having pendent lever-arms, of a coupling-rod connecting the said arms, a toothed segment applied to the axle of one of the slats, and a spring-detent for engaging the segment to lock the slats at any required inclination, substantially as specified.

7. The combination of overlapping grain-sieve slats having alternating long and short fingers and slots which are arranged at corresponding distances from the side edges of the slats, substantially as described.

8. In a grain-sieve, the combination of a series of pivoted slats arranged parallel and provided with a series of fingers, and spacing-wires extending at right angles to the slats and intermediately of the fingers, whereby the fingers and wires subdivide the space between adjacent slats and form supports for the mingled grain, straw, and other material, substantially as specified.

9. In a grain-sieve, the combination, with a rectangular frame and a series of slats pivoted therein, and provided with a series of openings as specified, of a series of wires extending longitudinally of the frame and passing through said openings in the slats, the wires being detachably connected with the first slat of the series, substantially as described.

FRANK FREDEEN.

Witnesses:
   A. R. LOWELL,
   GEO. W. SEYMOUR.